United States Patent [19]

Garner

[11] 3,784,451

[45] Jan. 8, 1974

[54] METHOD OF FABRICATING A COMPOSITE MOLD HAVING A RESIN-IMPREGNATED METAL MOLDING SURFACE

[75] Inventor: Paul Johnson Garner, Thorp Bay, England

[73] Assignee: Imperial Chemical Industries Limited, London, England

[22] Filed: Apr. 24, 1972

[21] Appl. No.: 246,924

Related U.S. Application Data

[63] Continuation-in-part of Ser. No. 886,782, Dec. 19, 1969, abandoned.

[30] Foreign Application Priority Data

June 23, 1969 Great Britain.................. 31606/69

[52] U.S. Cl............. 204/20, 29/527.2, 29/DIG. 12, 164/19, 164/46, 204/38 E, 264/225, 425/DIG. 30
[51] Int. Cl............................................... C73b 5/60
[58] Field of Search................. 204/6, 9, 15, 38 B, 204/38 E, 20; 264/225, 227; 164/6, 15, 19, 46; 29/527.2, 527.3, DIG. 39, DIG. 12; 425/DIG. 30

[56] References Cited
UNITED STATES PATENTS

| 1,681,447 | 8/1928 | Torrison............................ 204/6 UX |
| 1,935,916 | 11/1933 | Ragsdale............................ 164/46 X |
| 3,101,065 | 8/1963 | Kalis............................ 264/225 UX |
| 1,834,763 | 12/1931 | Bonsieur............................ 204/6 X |
| 2,680,699 | 6/1954 | Rubin................................ 204/20 X |
| 2,793,177 | 5/1957 | Fourier.............................. 204/20 X |
| 3,548,050 | 12/1970 | Mozer................................. 264/227 |

*Primary Examiner*—Richard J. Herbst
*Assistant Examiner*—D. C. Reiley, III
*Attorney*—Cushman, Darby & Cushman

[57] ABSTRACT

Producing a mould, particularly a prototype mould by spraying a metal shell on to model, impregnating the metal shell with a curable resin so that it is no longer porous, electroplating the shell to form a moulding surface and backing the shell to produce a mould.

11 Claims, No Drawings

METHOD OF FABRICATING A COMPOSITE MOLD HAVING A RESIN-IMPREGNATED METAL MOLDING SURFACE

This application is a continuation-in-part of application Ser. No. 886,782 filed 19 Dec. 1969, now abandoned.

The present invention relates to a process for the production of moulds. In particular the present invention is concerned with the production of moulds suitable for the moulding of thermoplastic materials.

According to the present invention we provide in a process for making a mould comprising forming by spraying a shell of metal to the shape required to define at least part of a mould cavity. the improvement comprising impregnating the shell by applying a curable resin to at least the surface of said shell which is to define the shape of the moulding surface, curing the resin and electroplating at least said defining surface with another metal layer to form the moulding surface.

The present invention also provides moulds whenever made by this process.

It is to be understood that the term "moulding surface" refers to the surface against which material being fabricated is to be moulded in the finished mould.

The formation of a metal layer by a metal spraying technique, e.g., by compressed air spraying of molten metal or by flame spraying is a most useful method for the production of a mould shell, since such a technique is particularly convenient to use and relatively inexpensive. By contrast, the formation of an entire metal shell by electrodeposition is very time consuming and therefore expensive. It would, however, be desirable to electroplate the surface of a sprayed metal shell since the plated metal layer would provide a very smooth nonporous molding surface. Further metal plating of the impregnated shell would be particularly useful for moulds which are used in injection moulding as the plating would provide a particularly hard wearing moulding surface which is resistant to polymer erosion. Furthermore the plated surfaces would be less likely to scratch and would provide a good finish to articles produced in the mould.

Unfortunately, sprayed metal layers and particularly flame sprayed layers tend to be porous and therefore tend to absorb the electrolyte when immersed in coating baths. This often results in poor adhesion between the sprayed metal shell and the electroplated layer since the trapped electrolyte tends to corrode the metal at the shell-electroplated layer interface. This disadvantage may be overcome by impregnating the shell before plating according to the present invention wherein the pores of the shell in the region of the surface to be plated become blocked with the cured resin which prevents the tendency of electrolyte absorption during plating.

Thus, in the present invention, the impregnated metal shell is electroplated with another metal layer over at least the surface of the shell which would in the absence of a further plated layer, have been the moulding surface in the finished mould. Also the metal plating separates the impregnating resin from the material that is fabricated in the mould and thus prevents the moulding being contaminated if the resin is decomposed at the moulding temperature.

It is important in our process that the curable resin be applied to at least the surface of the metal shell which is to define the shape of the moulding surface formed by the plated metal layer. If the curable resin is only applied to the surface of the shell which is not intended to define the shape of the moulding surface, i.e., to the surface opposite the defining surface on the other side of the shell, then the curable resin will not effectively, if at all, block the pores in the region of the shell surface intended to define the moulding surface and will therefore not effectively prevent absorption of the electrolyte through this surface during metal plating. It is, of course, within the scope of our invention that the curable resin be applied only to the shell surface intended to define the shape of the moulding surface in the finished mould.

Any metal from which a shell can be formed may be used in our invention but we prefer that if the metal shell is formed by flame spraying the metal is zinc, because this provides a particularly true reproduction of the model surface. Another suitable metal is aluminium because it is light and has little tendency to crack, is high melting which enables higher moulding temperatures to be used and is readily sprayed at a high rate.

The most convenient way of impregnating the metal shell with a curable resin is to dip the shell in a bath of the liquid resin so that the resin is either applied to one surface alone (that surface which is to define the shape of the moulding surface) or to both surfaces; the resin may be in solution, dispersion or heated to above its melting point whichever is most suitable depending on the nature of the resin. The shell, impregnated with the resin is then removed from the bath of the resin, wiped to remove any excess resin from its surface and dried. Our preferred form of resins are those which may be cured to a hard, heat resistant form and epoxy, polyester resins and amine aldehyde or phenol aldehyde condensation resins are our preferred materials.

After the impregnated metal shell has been treated to set the resin by for example heating to cure a thermosetting material or cooling to set a thermoplastic material the face of the shell which is to define the shape of moulding surface against which the moulding is to be formed is electroplated with a metal layer which provides a smooth moulding surface against which the moulding may be formed. We prefer that the impregnated shell be coated with a layer of copper, nickel or chromium. Alternatively, the impregnated shell may be coated with a series of layers and our preferred mould is an impregnated zinc shell coated with a layer of copper which is plated with a first layer of nickel and then a layer of chromium.

The shell of metal may conveniently be formed by spraying around a model of the article to be moulded which may be made in any required manner and may be of any suitable material providing it is not adversely affected by the conditions used during metal spraying. The model may be made of wood, metal, plaster, synthetic thermoplastic, thermosetting resins, rubber especially silicone rubber, wax, plasticine, clay or glass reinforced polyester resin. We prefer that the model be mounted on a wood or metal base which has angled edges which provides means of keying the sprayed metal coating around the model, as is described in our United States Pat. No. 3,638,299. The model should preferably contain cooling pipes which should be fixed as close to the surface to be sprayed as possible. We further prefer that the model is sprayed with a release agent such as polyvinyl alcohol before spraying with metal. The release agent allows the metal shell to be parted readily from the model when immersed in water and also assists in the satisfactory laying down of the initial coating of the sprayed metal.

We have set out above a process for the production of plated mould shells which may be used to provide the moulding surfaces in moulds particularly in moulds used in plastics fabrication. However, the metal shells are fragile and its is therefore necessary to provide strengthening and where necessary to enable the mould to be used in moulding operations where the mould is subjected to high pressures. This is particularly important if the mould is to be used in injection moulding operations. The nature of the backing that is necessary will depend upon the use to which the mould is to be put. For example, if the mould is to be used for vacuum forming of thermoplastics or in the rotational moulding it will not be subjected to particularly high pressures during moulding and the necessary support may be provided by a simple framework. For example the sprayed metal layer may be particularly thick or the shell may be backed with cement, plaster of paris or an epoxy resin.

On the other hand if the impregnated plated metal shells of the present invention are to be used as the mould defining surfaces of injection moulds the shell should be backed with a material that will enable the mould to withstand high pressures. The mould should be able to withstand the high pressures due to the injection of the thermoplastic materials into the mould and also the forces due to the closing of the two halves of the injection mould. In conventional injection moulding processes the thermoplastic material is cooled after it has been injected into the mould and thus we prefer that, when the impregnated metal shells of the present invention are used in injection moulds they should be backed with cooling pipes. A particularly suitable way of backing the impregnated metal shell in the production of an injection mould is described and illustrated in our copending U.S. application Ser. No. 886,690, filed Dec. 16, 1969, now abandoned.

The reinforcing backing for the mould may be applied either before the shell has become impregnated with a curable resin and plated or afterwards. We prefer, however, to provide the sprayed shell with at least some reinforcing backing before impregnation and plating (preferably sealing the backing, if it is to be immersed, from the electrolyte, e.g., by painting) in order to be able to handle the fragile metal shell more easily and prevent distortion thereof during impregnation and plating.

The process of the present invention is particularly applicable to the production of moulds by the processes described in our copending U.S. application Nos. 886,690 and 885,172, filed Dec. 15, 1969, now abandoned and U.S. Pat. No. 3,638,299 in which a mould is manufactured by forming a shell of metal around a model of the article to be moulded and pipes are fixed to the said metal shell which is then backed with concrete to encase the pipes whilst leaving their ends exposed. The present invention is particularly relevant to these processes when the metal shell is formed by metal spraying, in particular by flame spraying.

Our invention is particularly useful in the production of moulds which are used in injection moulding. These moulds are generally known as split moulds and are made in two halves and the two halves may conveniently be made separately by the process of the present invention and then located together. Alternatively, and as is preferred, one half may be made by the process of this invention and this first half used as a model for the production of the other half of the moulding.

I claim:

1. In a process for making a mould comprising forming by spraying a shell of metal to the shape required to define at least part of a mould cavity, the improvement comprising impregnating the shell by applying a curable resin to at least the surface of said shell which is to define the shape of the moulding surface, curing the resin and electroplating at least said defining surface with another metal layer to form the moulding surface.

2. A process according to claim 1 in which the metal shell is provided with a reinforcing backing before it is impregnated with a curable resin.

3. A process according to claim 1 in which the metal shell is formed by spraying metal on to a model of the article to be moulded.

4. A process according to claim 3 in which the model is coated with a release agent before spraying the metal.

5. A process according to claim 1 in which the metal shell is formed by flame spraying.

6. A process according to claim 1 in which the metal is zinc.

7. A process according to claim 1 in which the metal shell is at least 1/16 inch thick.

8. A process according to claim 1 in which the metal shell is about 0.25 inch thick.

9. A process according to claim 1 in which the resin comprises an epoxy resin.

10. A process according to claim 1 in which the resin comprises a polyester resin.

11. A process according to claim 1 in which the resin comprises amine aldehyde or phenol aldehyde condensation resin.

* * * * *